(12) United States Patent
Tighe et al.

(10) Patent No.: US 7,803,497 B2
(45) Date of Patent: Sep. 28, 2010

(54) FUEL CELL STACK THAT UTILIZES AN ACTUATOR TO SWITCH BETWEEN INTERDIGITATED AND STRAIGHT FLOW FOR OPTIMIZING PERFORMANCE

(75) Inventors: Thomas W Tighe, Bloomfield, NY (US); Mark Mathias, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1160 days.

(21) Appl. No.: 11/341,285

(22) Filed: Jan. 27, 2006

(65) Prior Publication Data

US 2007/0178355 A1    Aug. 2, 2007

(51) Int. Cl.
*H01M 8/02* (2006.01)
*H01M 8/00* (2006.01)

(52) U.S. Cl. .................... 429/514; 429/512; 429/457
(58) Field of Classification Search .............. 429/38
See application file for complete search history.

(56) References Cited

U.S. PATENT DOCUMENTS

2004/0091760 A1  5/2004  Mizutani et al.
2004/0157103 A1*  8/2004  Takeguchi et al. ............. 429/32
2005/0069751 A1*  3/2005  Zhang et al. .................. 429/39
2005/0191541 A1  9/2005  Gurau et al.

FOREIGN PATENT DOCUMENTS

EP        1519438 A2    3/2005
JP       2004253366    *  9/2004

* cited by examiner

*Primary Examiner*—Dah-Wei D Yuan
*Assistant Examiner*—Maria J Laios
(74) *Attorney, Agent, or Firm*—John A. Miller; Miller IP Group, PLC

(57) ABSTRACT

A fuel cell stack that includes an actuating device or devices for selectively providing interdigitated reactant gas flow and straight reactant gas flow through reactant gas flow channels to reduce water accumulation in the diffusing media layers of the stack. In one embodiment, the fuel cell stack employs internal actuators that selectively close the inlet end of every other flow channel and the outlet end of every other opposite flow channel to provide the interdigitated flow. In another embodiment, the interdigitated flow is provided by external actuation where two inlet manifolds and two outlet manifolds are provided. One input manifold is closed to close the input ends of every other flow channel and one outlet manifold is closed to close the output ends of every other opposite flow channel.

6 Claims, 3 Drawing Sheets

US 7,803,497 B2

FUEL CELL STACK THAT UTILIZES AN ACTUATOR TO SWITCH BETWEEN INTERDIGITATED AND STRAIGHT FLOW FOR OPTIMIZING PERFORMANCE

BACKGROUND OF THE INVENTION

1. Field of the Invention

This invention relates generally to a fuel cell stack that selectively provides interdigitated reactant gas flow and, more particularly, to a fuel cell stack including an actuation device that is selectively switched to provide an interdigitated reactant gas flow or a straight reactant gas flow.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For the automotive fuel cell stack mentioned above, the stack may include about two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows. Diffusion media layers are provided between the bipolar plates and the catalyst layer to allow gas transport to the catalyst layer and water transport from the MEA.

As is well understood in the art, the membranes within a fuel cell need to have a certain relative humidity so that the ionic resistance across the membrane is low enough to effectively conduct protons. Water vapor and liquid water are generated by the electrochemical process and provide some or all of the necessary humidification. The cathode inlet air may be humidified in some fuel designs for this purpose. However, during operation of the fuel cell, moisture from the MEAs and the external humidification may collect in the diffusion media layers, especially around lands of the plates between the flow channels and in the anode and cathode flow channels. Significant water accumulation in the diffusion media layers may prevent some of the reactant gas flow from reaching the catalyst layers, which may reduce cell performance.

It is known in the art to remove liquid water from the diffusion media layers of the fuel cells by providing interdigitated reactant gas flow. Particularly, every other reactant gas flow channel is blocked at the inlet end and every other opposite reactant gas flow channel is blocked at the outlet end so that the reactant gas flowing down one channel is forced through the diffusion media layer into the adjacent flow channels. The flow of the reactant gas over the lands of the bipolar plate in the diffusion media layer forces the water into the adjacent channels and out of the fuel cell. A fuel cell will benefit mostly by providing the interdigitated reactant gas flow on the cathode side of the fuel cells. However, it is known to also be beneficial to provide such interdigitated flow on the anode side of the fuel cells.

By blocking the reactant gas flow channels in this manner to provide the interdigitated flow, a pressure drop is created across the stack that makes the compressor have to work harder to force the air through the stack, thus consuming a significant amount of energy that affects system performance. Also, continuous interdigitated flow typically causes water accumulation at the outlet end of the inlet flow channels and the inlet end of the outlet flow channels that could block the flow channels.

SUMMARY OF THE INVENTION

In accordance with the teachings of the present invention, a fuel cell stack is disclosed that includes an actuating device or devices for selectively providing interdigitated reactant gas flow and straight reactant gas flow through reactant gas flow channels to reduce water accumulation in the diffusion media layers of the stack. In one embodiment, the fuel cell stack employs internal actuators that selectively close the inlet end of every other flow channel and the outlet end of every other opposite flow channel to provide the interdigitated flow. In another embodiment, the interdigitated flow is provided by external actuation where two inlet manifolds and two outlet manifolds are provided. One input manifold is closed to close the input ends of every other flow channel and one outlet manifold is closed to close the output ends of every other opposite flow channel to provide the interdigitated flow.

Additional features of the present invention will become apparent from the following description and appended claims, taken in conjunction with the accompanying drawings.

DETAILED DESCRIPTION OF THE EMBODIMENTS

The following discussion of the embodiments of the invention directed to techniques for selectively providing interdigitated reactant gas flow and straight gas flow in a fuel cell stack is merely exemplary in nature, and is in no way intended to limit the invention or its applications or uses.

Figure 1:
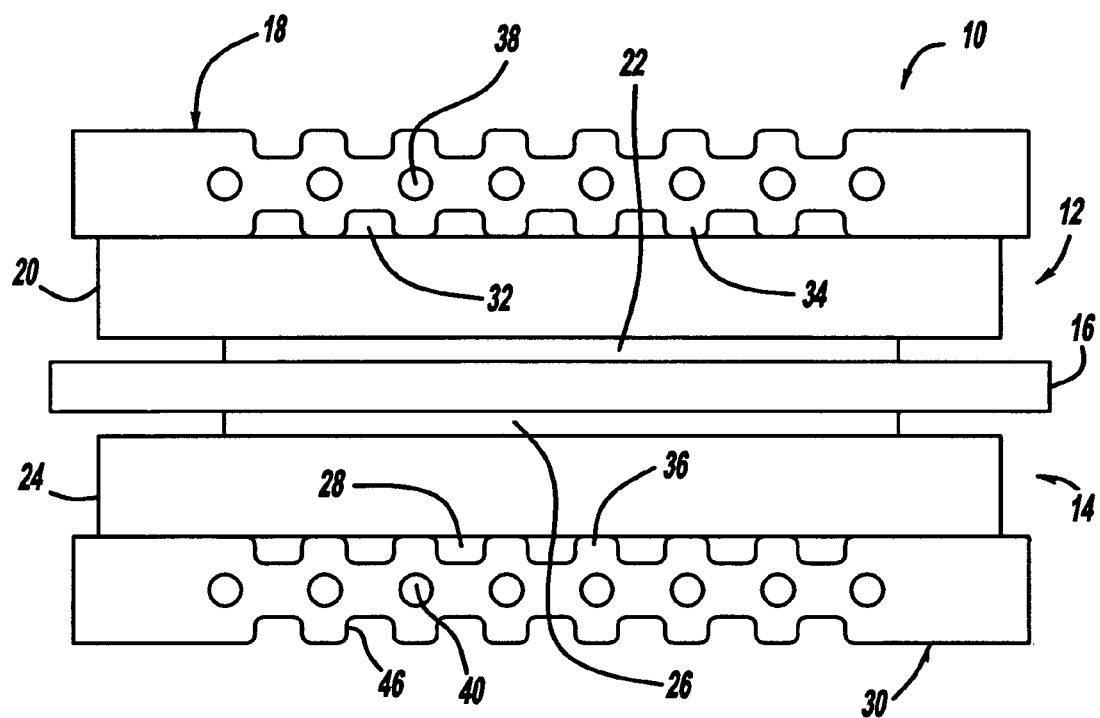
FIG. 1 is a cross-sectional view of a fuel cell in a fuel cell stack.

FIG. 1 is a cross-sectional view of a fuel cell 10 that is part of a fuel cell stack of the type discussed above. The fuel cell 10 includes a cathode side 12 and an anode side 14 separated by an electrolyte membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they electrochemically react with the oxygen in the airflow and the return electrons in the catalyst layer 22 to generate water as a by-product. The bipolar plate 18 includes lands 34 between the flow channels 32 and the bipolar plate 30 includes lands 36 between the flow channels 28. Cooling fluid flow channels 38 are provided in the bipolar plate 18 and cooling fluid flow channels 40 are provided in the bipolar plate 30.

Figure 2:
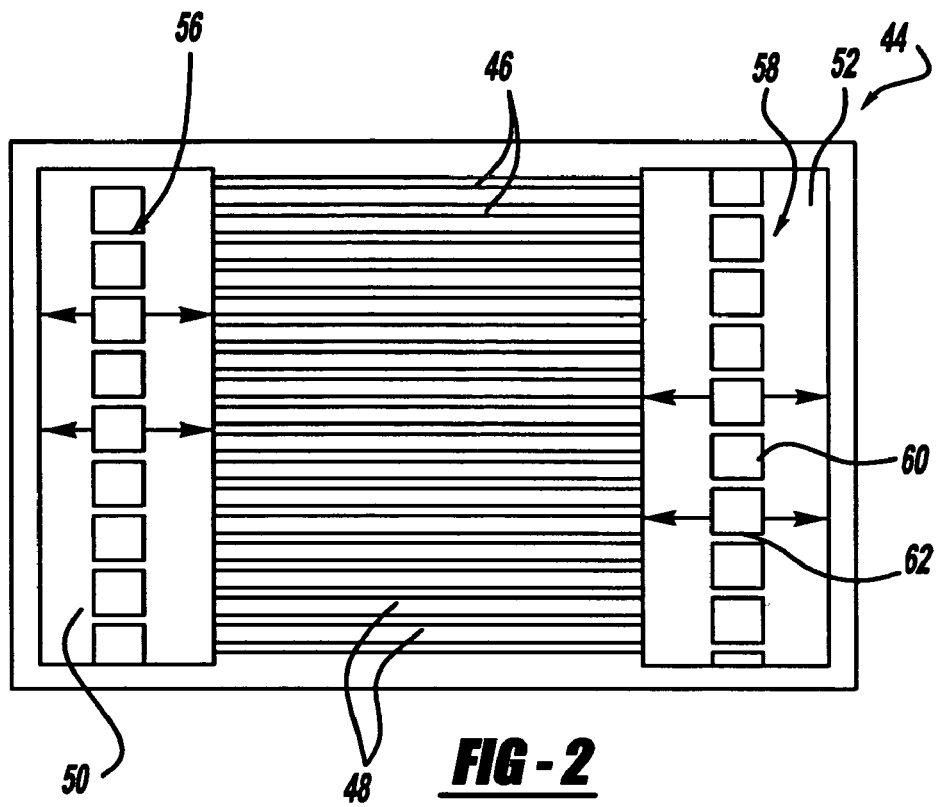
FIG. 2 is a top, cross-sectional plan view of a fuel cell stack including internal actuators for selectively closing reactant gas flow channels where the reactant gas flow channels are all open to provide straight flow, according to an embodiment of the present invention.

FIG. 2 is a top, cross-sectional plan view of a fuel cell stack 44. In this diagram, the cross-section is taken through a cathode side of a fuel cell in the stack 44 to show an alternating configuration of reactant gas flow channels 46 and lands 48 of a bipolar plate therebetween. An inlet manifold 50 receives the airflow from the compressor (not shown) to provide the reactant gas flow to the channels 46 in all of the fuel cells in the stack 44. Reactants that are not consumed by the stack 44 are output from the stack 44 through an outlet manifold 52.

According to the invention, a first actuator 56 is provided in the inlet manifold 50 and a second actuator 58 is provided in the outlet manifold 52. The actuators 56 and 58 include a series of cover portions 60 separated by perforations 62. In one non-limiting example, the actuators 56 and 58 are a flat plate including holes that define the perforations 62. The plate can be a metal plate including a resilient sealing cover portion, such as a low durometer rubber, that is sealed against the ends of the flow channels 46. Other actuator designs can be used as would be appreciated by those skilled in the art, as long as the portion of the actuators 56 and 58 in contact with the flow channels 46 is non-conductive. The actuators 56 and 58 can be mounted to the end plates of the stack 44.

Figure 3:
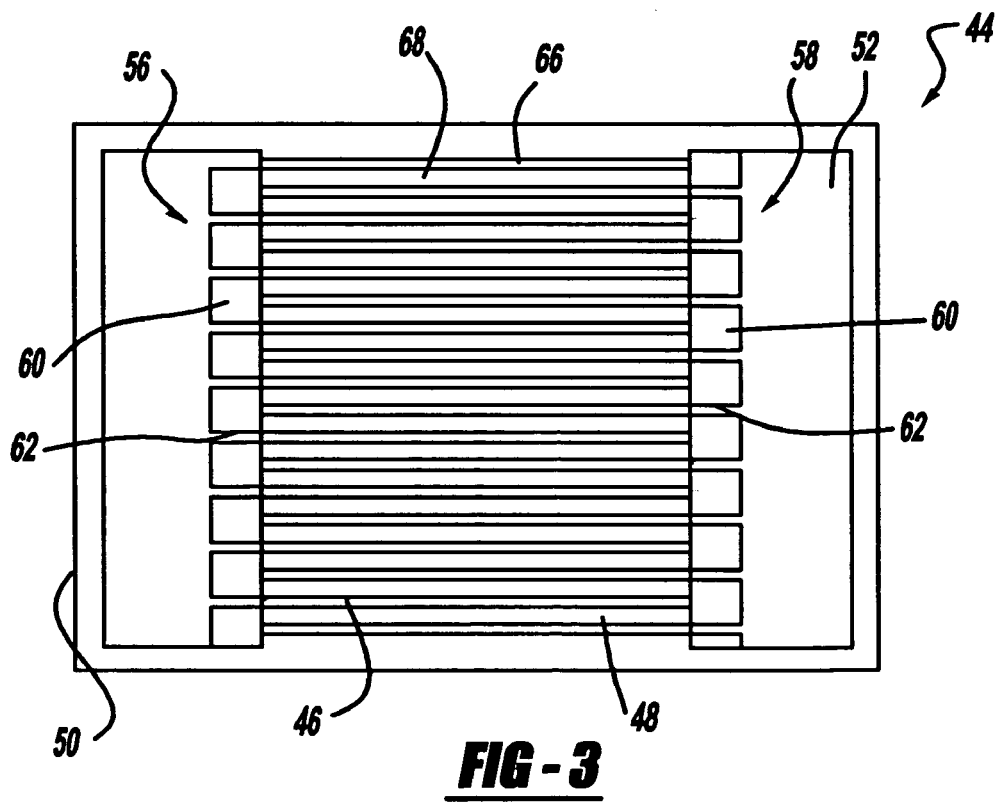
FIG. 3 is a top, cross-sectional plan view of the fuel cell stack shown in FIG. 2 where the internal actuators are positioned to close alternating input ends and output ends of the reactant gas flow channels to provide interdigitated flow, according to an embodiment of the present invention.

The actuators 56 and 58 are shown in a straight flow position in FIG. 2 where none of the inlet ends or the outlet ends of the flow channels 46 are blocked. FIG. 3 is a top, cross-sectional view of the fuel cell stack 44 where the actuators 56 and 58 are in an interdigitated flow position to selectively cover some of the input ends and some of the output ends of the flow channels 46. Particularly, the cover portions 60 of the actuator 56 cover the inlet ends of every other flow channel 46 beginning with a first flow channel 66, where the perforations 62 leave the ends of the other flow channels 46 open. Likewise, the cover portions 60 of the actuator 58 cover the outlet ends of every other flow channel 46 beginning with a flow channel 68 that is opposite to those flow channels 46 having a covered inlet end. Therefore, reactant gas flow introduced into the open ended flow channels 46 is forced through the diffusion media layer under the lands 48 into an adjacent channel 46 that does not have an outlet end covered.

Figure 4:
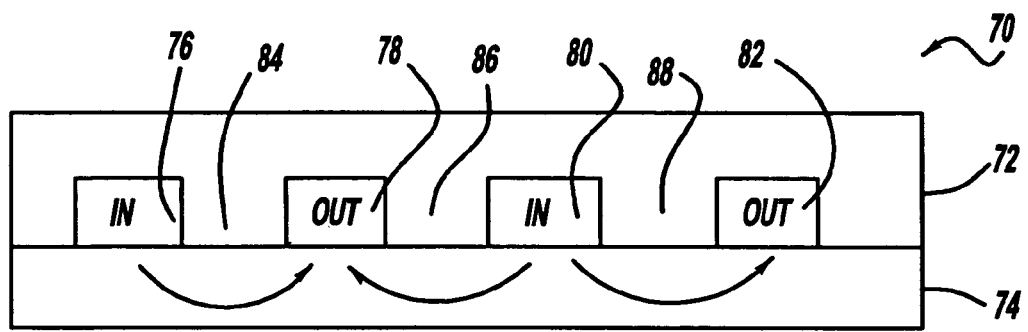
FIG. 4 is a cross-sectional view of a portion of a fuel cell in a fuel cell stack showing interdigitated reactant gas flow through a diffusion media layer.

FIG. 4 is a partial cross-sectional view of a fuel cell 70 including a bipolar plate 72 and a diffusion media layer 74 illustrating interdigitated flow. A first flow channel 76 in the plate 72 includes an unblocked inlet end and a blocked outlet end, a second flow channel 78 in the plate 72 includes a blocked inlet end and an unblocked outlet end, a third flow channel 80 in the plate 72 includes an unblocked inlet end and a blocked outlet end and a fourth flow channel 82 in the plate 72 includes a blocked inlet end and an unblocked outlet end. Therefore, reactant gas flowing down the flow channel 76 is forced through the diffusion media layer 74 under land 84 to be output from the channel 78. Reactant gas flow entering the flow channel 80 is forced through the diffusion media layer 74 under lands 86 and 88 to be output from the channels 78 and 82.

The discussion herein describes selectively providing interdigitated flow and straight flow on the cathode side of the fuel cells in the fuel cell stack. However, as will be appreciated by those skilled in the art, some fuel cells may benefit from providing such selective interdigitated flow on the anode side of the fuel cell.

By selectively providing the interdigitated flow only at certain times, a high pressure drop across the stack 44 caused by the interdigitated flow does not occur for all operating conditions in the stack 44. Any suitable control technique can be used to determine when the stack 44 should be switched from the straight flow as shown in FIG. 2 to the interdigitated flow as shown in FIG. 3. For example, the control system could monitor a pressure drop across the stack 44 or the cell voltage of each fuel cell in the stack 44, where an increase in the pressure drop indicates water accumulation and a drop in cell voltage indicates water accumulation as a result of reactant gas failing to reach the membrane 16.

Fuel cell performance can be improved by selectively providing interdigitated flow to remove water from the active area of the cell. Further, the interdigitated flow can be used for water removal before a freezing condition might occur. Also, the fuel cells can diagnose the amount of water that accumulates over the lands of the diffusion media layers when running in the straight mode. This amount of water could be archived by measuring the pressure drop when the fuel cell stack is in the interdigitated mode after switching from the straight flow to the interdigitated flow.

Figure 5:
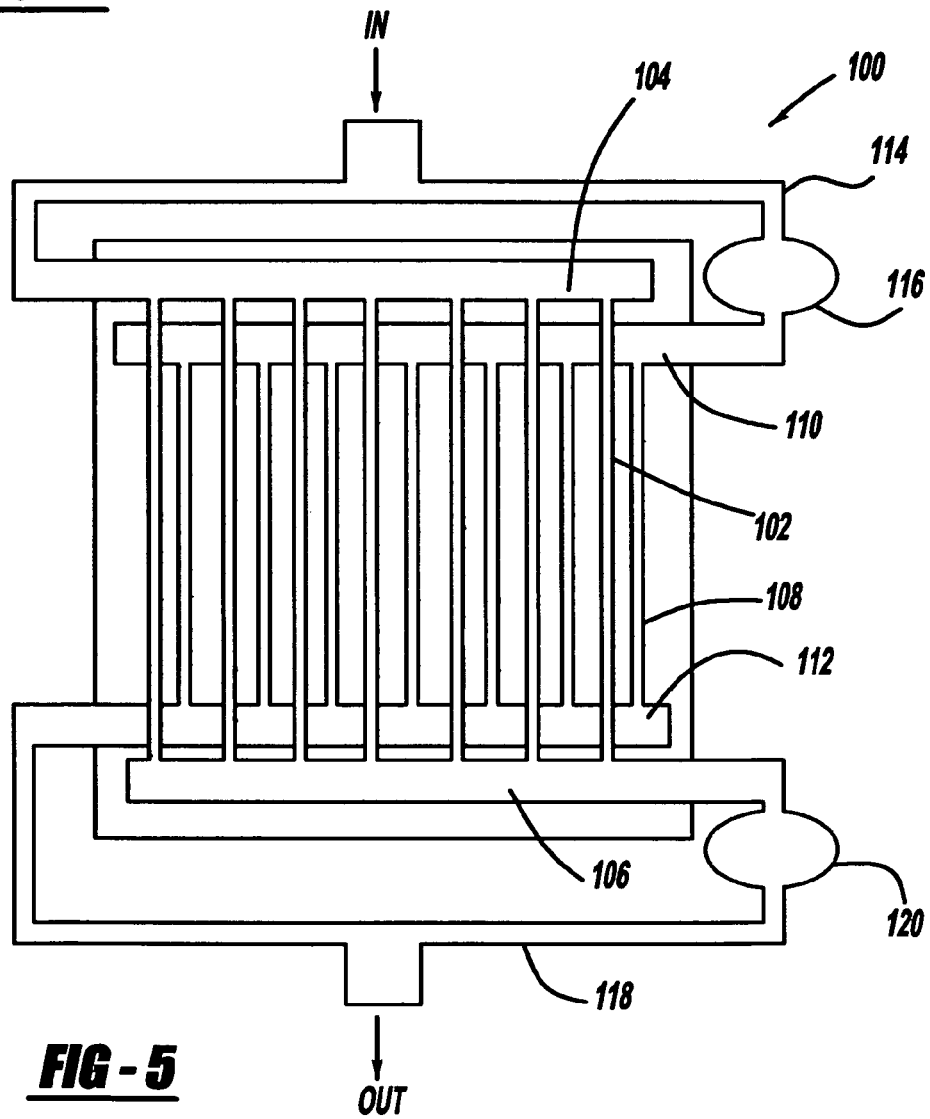
FIG. 5 is a top plan view of a fuel cell stack including external actuation for selectively providing interdigitated flow, according to another embodiment of the present invention.

FIGS. 2 and 3 shown an embodiment of the invention where the actuators 56 and 58 provide internal actuation. In another embodiment of the invention, the switching between the straight flow and the interdigitated flow can be provided by external actuation. FIG. 5 is a top, cross-sectional view of a fuel cell stack 100 including a series of flow channels 102 coupled to a first inlet manifold 104 and a first outlet manifold 106, and a series of flow channels 108 coupled to a second inlet manifold 110 and a second outlet manifold 112. The inlet manifolds 104 and 110 are both coupled to an external pipe 114 that receives a reactant gas input flow. A first valve 116 is provided in the pipe 114. Likewise, the outlet manifolds 106 and 112 are coupled to an outlet pipe 118 that includes a valve 120.

During straight flow, the valves 116 and 120 are open so that both the inlet manifolds 104 and 110 receive the input reactant gas from the pipe 114 and all of the exhausted reactant gas is output to both of the outlet manifolds 106 and 112 and collected by the pipe 118. For interdigitated flow, the valves 116 and 120 are closed so that reactant gas is not provided to the inlet manifold 110 and the reactant gas is not accepted by the outlet manifold 106. This effectively blocks every other inlet end of the flow channels and every other outlet end of the flow channels. Therefore, the interdigitated flow is provided in the same manner as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack comprising:
a plurality of fuel cells each including a plurality of parallel reactant gas flow channels;
a reactant gas inlet manifold providing a reactant gas to the flow channels in each fuel cell;
a reactant gas outlet manifold receiving the reactant gas from the flow channels in each fuel cell;
a first actuation device positioned within the inlet manifold; and
a second actuation device positioned within the outlet manifold, wherein the first and second actuation devices are selectively actuated in a direction parallel to the flow in the plurality of reactant gas flow channels so that inlet ends of a first set of alternating flow channels of the plurality of flow channels are closed and outlet ends of a second set of opposite and alternating flow channels of the plurality of flow channels are closed in each fuel cell to provide interdigitated flow through the plurality of flow channels, wherein the first actuation device and the second actuation device are mounted to end plates of the fuel cell stack.

2. The fuel cell stack according to claim 1 wherein the first and second actuation devices are plates including perforations.

3. The fuel cell stack according to claim 1 wherein the first and second actuation devices include a non-conductive portion that is positioned in contact with the manifolds during the interdigitated flow.

4. The fuel cell stack according to claim 1 wherein the reactant gas inlet manifold, the reactant gas outlet manifold and the reactant gas flow channels are for the cathode side of fuel cells in the fuel cell stack.

5. The fuel cell stack according to claim 1 wherein the reactant gas inlet manifold, the reactant gas outlet manifold and the reactant gas flow channels are for the anode side of the fuel cells in the fuel cell stack.

6. The fuel cell stack according to claim 1 wherein the fuel cell stack is on a vehicle.

* * * * *